Oct. 11, 1949. S. BOUSKY 2,484,149
CLEANSING DEVICE FOR BALL BEARING ASSEMBLIES
Filed March 4, 1943 3 Sheets-Sheet 1

INVENTOR.
SAMUEL BOUSKY.
BY
Frank H Harmon
ATTORNEY.

Oct. 11, 1949. S. BOUSKY 2,484,149
CLEANSING DEVICE FOR BALL BEARING ASSEMBLIES
Filed March 4, 1943 3 Sheets-Sheet 2
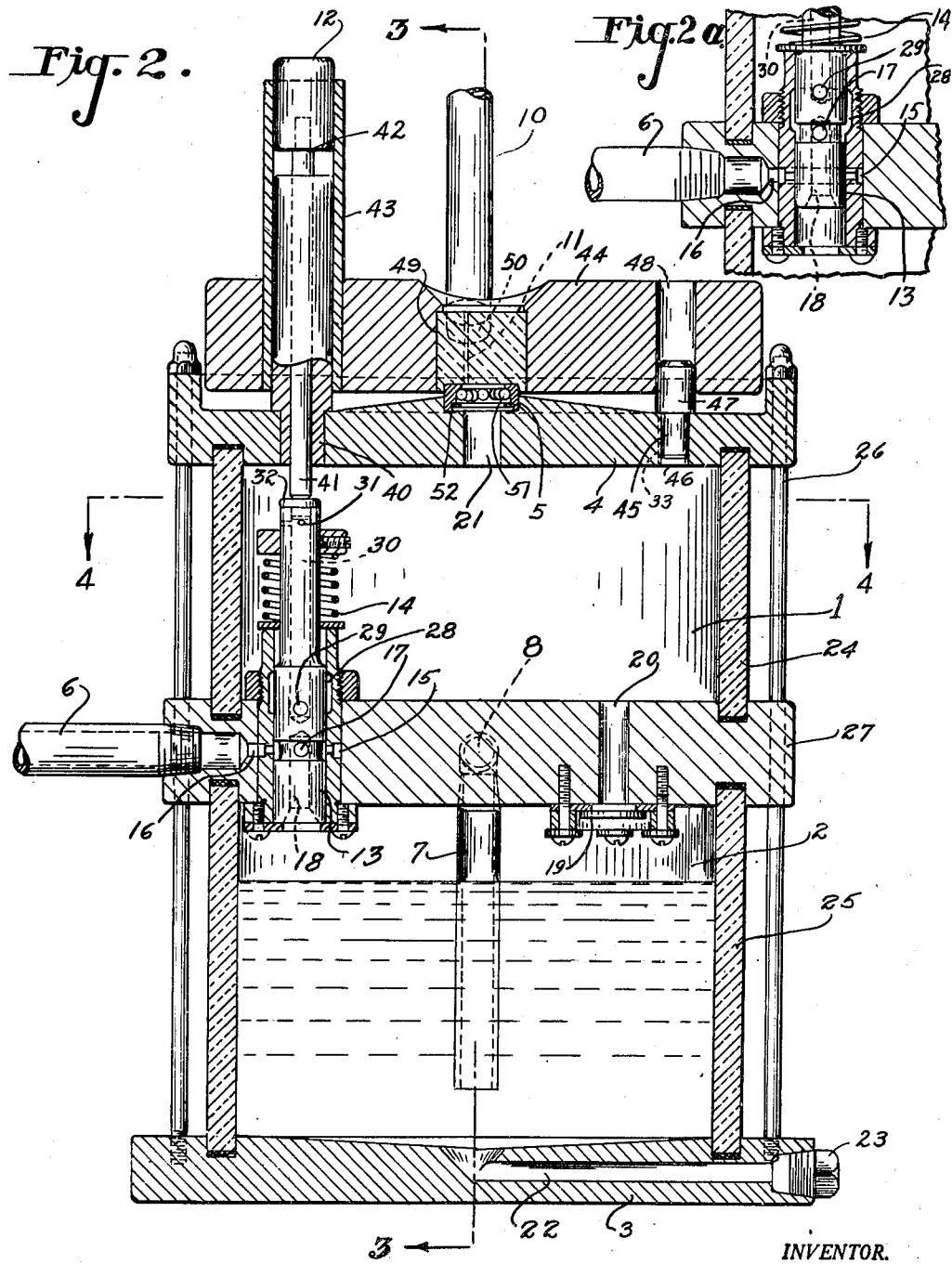
INVENTOR.
SAMUEL BOUSKY.
BY
ATTORNEY.

Oct. 11, 1949.   S. BOUSKY   2,484,149
CLEANSING DEVICE FOR BALL BEARING ASSEMBLIES
Filed March 4, 1943   3 Sheets-Sheet 3

INVENTOR.
SAMUEL BOUSKY.
BY
Frank H. Harmon
ATTORNEY.

Patented Oct. 11, 1949

2,484,149

UNITED STATES PATENT OFFICE 2,484,149

CLEANSING DEVICE FOR BALL BEARING ASSEMBLIES

Samuel Bousky, Shaker Heights, Ohio, assignor, by mesne assignments, to Jack & Heintz Precision Industries, Inc., Cleveland, Ohio, a corporation of Delaware Application March 4, 1943, Serial No. 477,973

5 Claims. (Cl. 134—95)

1

This invention has for one of its primary objects the provision of an improved cleansing device wherein delicate precision assemblies such as bearing assemblies, instruments, watches, clocks or the like may be automatically cleansed and lubricated.

With this end in mind it is proposed to provide a pressure air or lubrication system by means of which the moving parts of an assembly are subjected to a jet of pressure air or liquid such as a lubricant so as to result in a whirling movement of the moving parts and a thorough cleansing and lubrication of the same.

With the foregoing and other objects in view, the invention resides in the combination of parts and in the details of construction hereinafter set forth in the following specification and appended claims, certain embodiments thereof being illustrated in the accompanying drawings, in which:

Figure 2 is a view in vertical section taken through the main housing for the specimen supporting and cleansing device.

Figure 1:
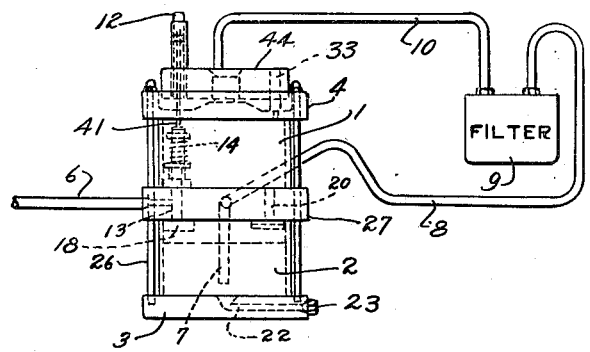
Figure 1 is a schematic illustration of the cleansing system in accordance with the invention.

Figure 2—A is an enlarged view in vertical section through the valve as shown in Figure 1.

Figure 3:
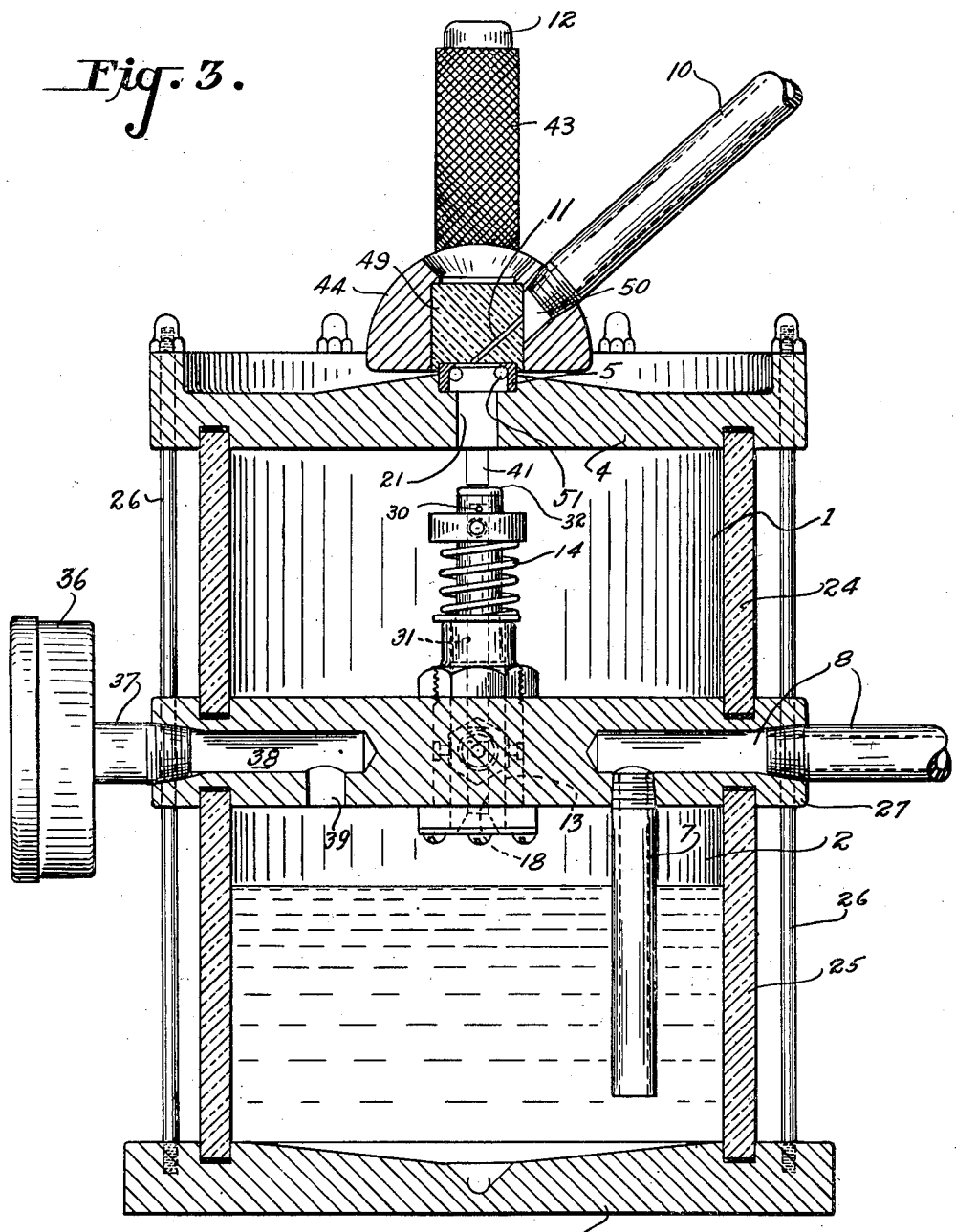

Figure 3 is a view in vertical section taken along line 3—3 of Figure 2.

Figure 4:
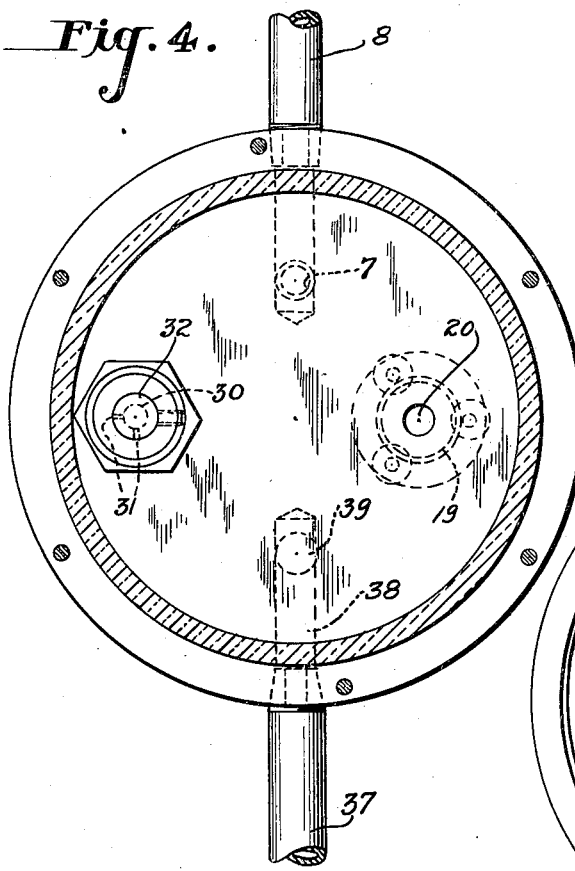

Figure 4 is a view in cross section taken along line 4—4 of Figure 2.

Figure 5:
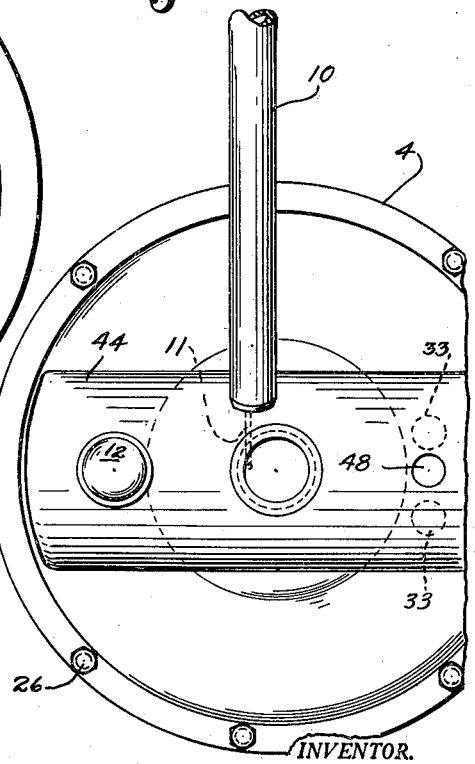

Figure 5 is a top plan view of the device.

Referring more particularly to the drawings the device generally comprises a main casing with upper and lower compartments 1 and 2, a base 3 and an upper specimen supporting plate 4. For purposes of illustration the specimen to be cleansed and lubricated is a ball bearing race 5 for housing ball bearings 51. The system generally includes an oil reservoir in compartment 2, a compressed air inlet pipe 6, oil outlet pipes 7 and 8 leading to an oil filter 9 and an oil return pipe 10 having a restricted oil jet outlet 11 extending tangentially to the balls of the bearing assembly 5 to be cleansed. Plate 4 is apertured to receive a stationary bushing 40 to slidably receive a rod 41 having a shoulder 42 to be engaged by a hand operated plunger head 12. Slidably and pivotally removably mounted about a bushing 43, which carries plunger elements 12 and 41, is a head piece 44. This head piece is further removably held in position on plate 4 by means of a pin having a reduced portion 45 fitting in an aperture 46 in plate 4 and an enlarged portion 47 fitting in an aperture 48 in head piece 44.

2

Head piece 44 has an insert block 49 and a passage 50 which is screw threaded to receive a pipe 10. Surrounding an aperture 21 in the plate 4 is an enlarged recess 52 for receiving the ball bearing race 5 for housing the balls 51 to be cleansed.

When the ball bearing assembly is in place and it is desired to set the machine into operation, the removable plunger 12 is pressed downwardly to press valve 13 into the position shown in Figure 2 against the action of a compression coil spring 14. This valve is provided with a circumferential groove 15 to register with inlet 16 of pipe 6 and a series of ports 17 leading to the interior passage 18 to the lower compartment 2. The resulting admission of compressed air on the head of oil raises a check valve 19 upwardly against the force of gravity to the position shown in Figure 2 to close the drain 20 from the upper to the lower compartment. At the same time oil is forced under pressure through pipes 7 and 8, through oil filter 9 and out through pipe 10 to the oil jet 11. As this pressure oil is ejected from the tangentially arranged jet it imparts a rotary motion to the balls within the race as they are thoroughly bathed and cleansed.

The oil and whatever sediment has been removed from the bearing assembly drains down through the outlet 21 into the upper compartment 1 and into drain 20. When the plunger 12 is released spring 14 forces the valve 13 upwardly and the compressed air is shut off. This brings the ports 17 into registry with the annular passage 28 and the compressed air remaining in chamber 2 flows through passage 18, ports 17, passage 28, into ports 29 and through passage 30 out through restricted ports 31 into upper chamber 1 out to atmosphere through passages 33. As this occurs, the check valve 19 drops down under the force of gravity and thus opens the drain for the oil to pass down into the oil reservoir 2. A sludge outlet 22 is closed by a plug 23. For convenience of inspection during operation the side walls 24 and 25 of the upper and lower compartments may be cylindrical and transparent and held in place by long bolts 26 passing through the upper and lower plates 4 and 3 and the intermediate partition 27.

In order to determine the pressure of the air within the lower chamber 2 there is provided a pressure gauge 36 communicating through tube 37 and passages 38 and 49 with chamber 2.

In high precision instruments such as gyro assemblies for automatic pilots and the like it is highly important to insure that the ball bearing assemblies be absolutely free of any sediment.

By means of this invention the balls are flushed with clean oil and spun within their race so that not only is the race absolutely clean but the entire spherical surface of each ball is thoroughly flushed and cleaned with oil.

Moreover, the ball bearing assembly is conveniently and removably placed in its seat and the plunger 12 depressed and the resulting flushing is automatic and consumes so little time that it makes it possible to repeat the operation quickly and readily in keeping with mass production and assembly purposes. The same principle of operation may be readily applied to other specimens than ball bearing assemblies, such as watches, jewelry and the like.

I claim:

1. In a device for cleansing ball bearing assemblies, a casing comprising an upper compartment and a lower compartment, said upper compartment having an aperture in its top plate leading to the exterior and recessed about said aperture to provide a retaining seat for a ball bearing assembly, a head piece removably attached to said top plate and carrying a block for pressing said bearing assembly in place, said block having an angular jet disposed tangentially with respect to the bearing assembly and a passage in said head piece leading from the jet to the exterior, said lower compartment being adapted to be partially filled with cleansing fluid as a reservoir therefor, a conduit leading from a point below the fluid level upwardly and exteriorly of the casing to fit in the passage in said head piece, a fluid drain outlet from said upper compartment into said reservoir and a check valve normally open under atmospheric pressure conditions to permit such drain, a source of air pressure communicating with said lower compartment for closing said check valve and putting a head of pressure on the oil to force the same through the conduit to said jet to rotate said ball bearings by oil pressure while cleaning the same as said oil drains into said upper compartment, and valve means manually operable to open said source of pressure air to said reservoir and automatically operable upon manual release to close the same.

2. In a device for cleansing ball bearing assemblies, a casing comprising an upper compartment and a lower compartment, said upper compartment having an aperture in its top plate leading to the exterior and recessed about said aperture to provide a retaining seat for a ball bearing assembly, a head piece removably attached to said top plate and carrying a block for pressing said bearing assembly in place, said block having an angular jet disposed tangentially with respect to the bearing assembly and a passage in said head piece leading from the jet to the exterior, said lower compartment being adapted to be partially filled with cleansing fluid as a reservoir therefor, a conduit leading from a point below the fluid level upwardly and exteriorly of the casing to fit in the passage in said head piece, a fluid drain outlet from said upper compartment into said reservoir and a check valve normally open under atmospheric pressure conditions to permit such drain, a source of air pressure communicating with said lower compartment for closing said check valve and putting a head of pressure on the oil to force the same through the conduit to said jet to rotate said ball bearings by oil pressure while cleaning the same as said oil drains into said upper compartment, and valve means manually operable to open said source of pressure air to said reservoir and automatically operable upon manual release to close the same and open communication for pressure air in said oil reservoir compartment to atmosphere.

3. In a device for cleansing ball bearing assemblies, a casing comprising an upper compartment having an opening to the atmosphere and a lower compartment, said upper compartment having an aperture in its top plate leading to the exterior and recessed about said aperture to provide a retaining seat for a ball bearing assembly, a head piece removably attached to said top plate and carrying a block for pressing said bearing assembly in place, said block having an angular jet disposed tangentially with respect to the bearing assembly and a passage in said head piece leading from the jet to the exterior, said lower compartment being adapted to be partially filled with cleansing fluid as a reservoir therefor, a conduit leading from a point below the fluid level upwardly and exteriorly of the casing to fit in the passage in said head piece, a fluid drain outlet from said upper compartment into said reservoir and a check valve normally open under atmospheric pressure conditions to permit such drain, a source of air pressure communicating with said lower compartment for closing said check valve and putting a head of pressure on the oil to force the same through the conduit to said jet to rotate said ball bearings by oil pressure while cleaning the same as said oil drains into said upper compartment, and valve means manually operable to open said source of pressure air to said reservoir and automatically operable upon manual release to close the same and open communication for pressure air in said oil reservoir compartment through said upper compartment to atmosphere.

4. In a device for cleansing ball bearing assemblies, a casing comprising an upper compartment having an opening to the atmosphere, and a lower compartment, said upper compartment having an aperture in its top plate leading to the exterior and recessed about said aperture to provide a retaining seat for a ball bearing assembly, a head piece removably attached to said top plate and carrying a block for pressing said bearing assembly in place, said block having an angular jet disposed tangentially with respect to the bearing assembly and a passage in said head piece leading from the jet to the exterior, said lower compartment being adapted to be partially filled with cleansing fluid as a reservoir therefor, a conduit leading from a point below the fluid level upwardly and exteriorly of the casing through a filter and to fit in the passage in said head piece, a fluid drain outlet from said upper compartment into said reservoir and a check valve normally open under atmospheric pressure conditions to permit such drain, a source of air pressure communicating with said lower compartment for closing said check valve and putting a head of pressure on the oil to force the same through the conduit to said jet to rotate said ball bearings by oil pressure while cleaning the same as said oil drains into said upper compartment, and valve means manually operable to open said source of pressure air to said reservoir and automatically operable upon manual release to close the same and open communication for pressure air in said oil reservoir compartment through said upper compartment to atmosphere to permit said check valve to automatically open.

5. In a device for cleansing ball bearing assemblies, a casing comprising an upper compartment and a lower compartment, said upper compartment having an aperture in its top plate leading to the exterior and recessed about said aperture to provide a retaining seat for a ball bearing assembly, a head piece removably attached to said top plate and carrying a block for pressing said bearing assembly in place, said block having an angular jet disposed tangentially with respect to the bearing assembly and a passage in said head piece leading from the jet to the exterior, said lower compartment being adapted to be partially filled with cleansing fluid as a reservoir therefor, a conduit leading from a point below the fluid level upwardly and exteriorly of the casing to fit in the passage in said head piece, a fluid drain outlet from said upper compartment into said reservoir and a check valve normally open under atmospheric pressure conditions to permit such drain, a source of air pressure communicating with said lower compartment for closing said check valve and putting a head of pressure on the oil to force the same through the conduit to said jet to rotate said ball bearings by oil pressure while cleaning the same as said oil drains into said upper compartment, and valve means for opening and closing said source of pressure air to said reservoir, and valve means in the form of a plunger normally spring operated to close said source of pressure air to said reservoir and manually operable to open the same and close said check valve and automatically spring operated upon manual release to close the source of air pressure and permit the check valve to open.

SAMUEL BOUSKY.

REFERENCES CITED

The following references are of record in the file of this patent:

UNITED STATES PATENTS

| Number | Name | Date |
|---|---|---|
| 950,885 | Wood | Mar. 1, 1910 |
| 1,265,413 | Wright | May 7, 1918 |
| 1,766,208 | Anstiss | June 24, 1930 |
| 1,878,277 | Hodge | Sept. 20, 1932 |
| 1,894,786 | Pew | Jan. 17, 1933 |
| 1,983,084 | Janus | Dec. 4, 1934 |
| 2,035,513 | Speranza | Mar. 31, 1936 |
| 2,160,214 | Jackson | May 30, 1939 |
| 2,243,446 | Terlesky et al. | May 27, 1941 |
| 2,208,244 | Born | July 16, 1940 |

FOREIGN PATENTS

| Number | Country | Date |
|---|---|---|
| 117,648 | Germany | Feb. 19, 1901 |
| 55,760 | Austria | Oct. 10, 1912 |
| 268,701 | Germany | Dec. 27, 1913 |
| 107,864 | Switzerland | Nov. 17, 1924 |
| 578,006 | Germany | June 8, 1933 |